(12) United States Patent
Beers et al.

(10) Patent No.: US 8,245,978 B1
(45) Date of Patent: Aug. 21, 2012

(54) MULTIPLE ASM OBIGGS WITH DIFFERENT PERMEABILITY AND SELECTIVITY MEMBRANES

(75) Inventors: Karl S. Beers, Upper Darby, PA (US); Charles L. Anderson, Wilmington, DE (US)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/107,141

(22) Filed: Jun. 30, 1998

(51) Int. Cl.
  *B64D 37/00* (2006.01)
(52) U.S. Cl. .......... 244/135 R; 55/323; 55/482; 137/88; 137/93; 96/7; 96/155
(58) Field of Classification Search .............. 244/135 R; 96/7, 202, 155; 55/320, 323, 342, 482; 137/88, 137/93
  See application file for complete search history.

(56) References Cited

U.S. PATENT DOCUMENTS

| | | | | |
|---|---|---|---|---|
| 3,691,730 A | * | 9/1972 | Hickey et al. ................ 55/166 |
| 3,948,626 A | | 4/1976 | Bragg | |
| 4,230,463 A | | 10/1980 | Henis et al. ................ 55/16 |
| 4,378,920 A | * | 4/1983 | Runnels et al. ............ 244/135 R |
| 4,397,661 A | | 8/1983 | King et al. ................ 55/158 |
| 4,556,180 A | | 12/1985 | Manatt ..................... 244/135 |
| 4,627,243 A | * | 12/1986 | Schaub ...................... 62/52 |
| 4,681,602 A | | 7/1987 | Glenn et al. ................ 55/21 |
| 4,717,394 A | | 1/1988 | Hayes ........................ 55/16 |
| 4,958,659 A | * | 9/1990 | Dowdall ................ 137/624.12 |
| 4,972,866 A | * | 11/1990 | Anthony et al. ............ 137/110 |
| 4,983,191 A | | 1/1991 | Ekiner et al. .............. 55/158 |
| 5,013,331 A | | 5/1991 | Edwards et al. ............ 55/16 |
| 5,015,270 A | | 5/1991 | Ekiner et al. .............. 55/16 |
| 5,034,024 A | | 7/1991 | Hayes ........................ 55/16 |
| 5,051,114 A | | 9/1991 | Nemser et al. ............ 55/16 |
| 5,085,676 A | | 2/1992 | Ekiner et al. .............. 55/158 |
| 5,096,468 A | | 3/1992 | Minhas ...................... 55/16 |
| 5,176,002 A | | 1/1993 | O'Brien et al. | |
| 5,388,650 A | | 2/1995 | Michael | |
| 6,293,525 B1 | * | 9/2001 | Ginsburgh et al. ............ 261/77 |

FOREIGN PATENT DOCUMENTS

| | | |
|---|---|---|
| EP | 207 721 | 1/1987 |
| FR | 2 264 566 | 10/1975 |
| WO | WO 99 34106 | 7/1999 |
| WO | WO 00 00389 | 1/2000 |

OTHER PUBLICATIONS

"Airline Industry Takes Fresh Look At Inerting", *Aviation Week and Space Technology*, U.S. McGraw-Hill, Inc., vol. 147, No. 2, pp. 60-61, Dornheim M.A.

"The Evolution of On-Board Inert Gas Generation Systems (OBIGGS)", *27th Annual Symposium on Safe Association*, Dec. 5-8, 1989, pp. 19-24, XP002122565.

(Continued)

*Primary Examiner* — J. Woodrow Eldred
(74) *Attorney, Agent, or Firm* — Christopher J. Cronin

(57) ABSTRACT

A method and system for providing nitrogen-enriched air (NEA) to aircraft fuel tanks using multiple air separation modules (ASMs). The ASMs employ membranes having different permeabilities and selectivities which are particularly selected to meet the varying NEA needs of the fuel tanks during flight.

28 Claims, 1 Drawing Sheet

OTHER PUBLICATIONS

DOT/FAA/AR-00/19 Cavage, William, M., The Cost of Implementing Ground-Based Fuel Tank Inerting in the Commercial Fleet, National Technical Information Service, Springfield, VA 22131, Final Report May 2000.

Air Liquide—MEDAL's Air Separation Membrane—The Technlolgoy at the Heart of OBIGGS, Inerting Task Group Presentation, Fuel Tank Harmonization Working Group, Mar. 18, 1998.

Air Liquide—GBI Cost Analysis—NEA System Architecture, GBI Cost Study Feb. 29, 2000.

Aviation Rulemaking Advisory Committee Fuel Tank Harmonization Working Group Final Report Jul. 1998 (Parts 1 of 3, 2 of 3, and 3 of 3).

Timpe, Ronald C., et al., Flight Safety, Endurance, and Evaporative Emissions Improvement Via Jet Fuel-Cooling-Polarjet® Fuel Treatmetn Demonstration, University of North Dakota, Oct. 1999.

Air Liquide Brochures of APSA® Advanced Product Supply Approach; FLOXAL® Nitrogen Membrane System; SOLVAL® VOC Removal and Recovery System; and VESTAL-O2 Control Unit. No date known.

\* cited by examiner

MULTIPLE ASM OBIGGS WITH DIFFERENT PERMEABILITY AND SELECTIVITY MEMBRANES

BACKGROUND OF THE INVENTION

1. Field of the Invention

The present invention generally relates to a method and system for inserting aircraft fuel tanks. The invention particularly relates to a method and system for providing nitrogen-enriched air (NEA) to aircraft fuel tanks using multiple air separation modules (ASMs). The ASMs employ membranes having different permeabilities and selectivities which are particularly selected to meet the varying NEA needs of the aircraft performance requirements.

2. Description of the Related Art

It is generally recognized that fuel vapors in an enclosed area such as a fuel tank may result in flame propagation or even an explosion if sufficient oxygen is present. The threat of an explosion, however, can be substantially reduced if the oxygen concentration in the fuel tank is lowered to 9% by volume or less.

Due to the risk of an explosion, some vehicles, particularly aircrafts, have been equipped with on-board inert gas generating systems (OBIGGS). The OBIGGS are intended to provide a supply of nitrogen or nitrogen-enriched gas to fill the vapor space or ullage in the fuel tank in order to lower its oxygen content and thereby reduce the possibility of an explosion.

Various OBIGGS have been proposed in the art. However, there remains a continuing need in the art for OBIGGS that have reduced size, weight, and operating cost, but yet can provide a sufficient amount and purity of NEA to inert, for example, aircraft fuel tanks during a variety of different operating conditions.

SUMMARY OF THE INVENTION

The present invention is intended to address this need in the art. It takes particular advantage of the fact that an aircraft has varying inert gas requirements during the course of its flight. For example, during level altitude or cruising, a relatively low rate of NEA flow is required to replace the fuel being used. During a descent maneuver such as landing, a higher rate of NEA flow is required to keep the internal pressure in the fuel tanks equal to the external pressure to minimize the in-rush of 21% by volume $O_2$ air and to maintain the ullage oxygen concentration at 9% by volume or lower. Likewise, during an ascent maneuver such as takeoff, a higher flow rate of NEA is required to inert the fuel tanks because of the evolution of dissolved $O_2$ from the fuel due to the drop in the atmospheric pressure.

Briefly, the present invention employs multiple gas separation modules which contain membranes having different permeabilities and selectivities to separate compressed air into NEA. The membrane modules are advantageously selected to provide the NEA required to inert the aircraft fuel tanks based on the aircraft's particular performance requirements, while minimizing the system's overall size, weight, and operating cost.

More particularly, in its first aspect, the present invention relates to a method for inserting an aircraft fuel tank. The method comprises the steps of:

(a) contacting compressed air with one or more first membrane modules at conditions effective to produce a first nitrogen-enriched air stream;

(b) introducing the first nitrogen-enriched air stream into the fuel tank during periods of low demand for nitrogen-enriched air;

(c) contacting compressed air with one or more second membrane modules at conditions effective to produce a second nitrogen-enriched air stream; and (d) introducing the second nitrogen-enriched air stream into the fuel tank during periods of high demand for nitrogen-enriched air. The first membrane modules have a lower $O_2$ permeance and a higher $O_2/N_2$ selectivity than the second membrane modules.

In its second aspect, the present invention relates to a system for inserting an aircraft fuel tank. The system comprises:

(a) one or more first membrane modules for separating compressed air into a first permeate stream comprising oxygen-enriched air and a first retentate stream comprising nitrogen-enriched air;

(b) a first conduit for conveying the first retentate stream into the fuel tank during periods of low demand for nitrogen-enriched air;

(c) one or more second membrane modules for separating compressed air into a second permeate stream comprising oxygen-enriched air and a second retentate stream comprising nitrogen-enriched air; and (d) a second conduit for conveying the second retentate stream into the fuel tank during periods of high demand for nitrogen-enriched air. The first membrane modules have a lower $O_2$ permeance and a higher $O_2/N_2$ selectivity than the second membrane modules.

As used herein, the "periods of low demand for nitrogen-enriched air" refer to instances when the volumetric output of the one or more first membrane modules can produce enough NEA to maintain the oxygen concentration in the ullage of the aircraft fuel tank below the explosive limit, which is currently believed to be about 9% by volume or less. An example of such a period includes while the aircraft is cruising or is maintaining a level altitude.

On the other hand, the "periods of high demand for nitrogen-enriched air" refer to instances when the volumetric output of the one or more first membrane modules cannot produce enough NEA to maintain the oxygen concentration in the ullage of the aircraft fuel tank below the explosive limit. Such periods include during ascent, descent, and mid-air refueling.

DETAILED DESCRIPTION OF THE INVENTION

Figure 2:
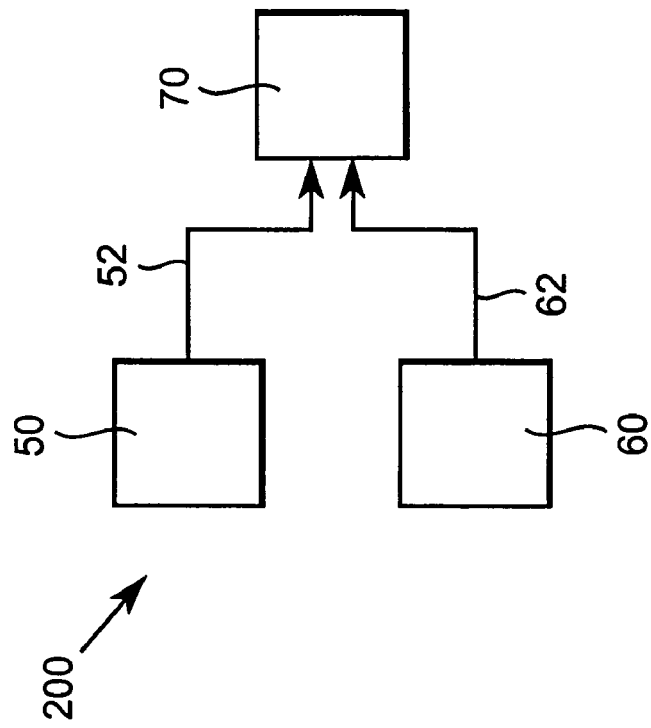
FIG. 2 depicts a system for inserting an aircraft fuel tank according to another exemplary embodiment of the present invention.

During level altitude or the cruising phase of an aircraft's flight, less NEA is required to maintain the oxygen concentration in the ullage of a fuel tank below the explosive limit. Thus, it is possible to use more energy efficient, higher performance membrane modules to supply the required NEA.

Accordingly, during periods of low NEA demand, compressed air is contacted with one or more first membrane modules at conditions effective to produce a first NEA stream. The compressed air can be from any source on board the aircraft such as engine bleed air, bleed air from the aircraft's environmental control system, or air from an independent compressor. Regardless of the source of the compressed air, it typically contains about 21% by volume $O_2$, 78% by volume $N_2$, and traces of Ar and other gases. The air, however, may have a lower oxygen concentration at higher altitudes.

There is a relationship between the compressed air pressure, which translates to the driving force across the membrane, and the number of membrane modules required to perform the desired separation, and thus the overall size and weight of the system. For example, it has been discovered that increasing the compressed air pressure from 30 psig (308.0 kPa) to 50 psig (445.8 kPa) can reduce the module weight as well as its overall size by over 50%. Therefore, it is preferred that the compressed air has a pressure ranging from 10 psig (170.2 kPa) to 300 psig (2168.3 kPa), and more preferably, from 20 psig (239.1 kPa) to 100 psig (790.3 kPa). The driving force across the membrane can also be effected or enhanced by applying a vacuum on the permeate side of the membrane.

The first membrane modules contain a membrane material that preferentially permeates oxygen and retains nitrogen. In addition, they are advantageously selected to have a lower $O_2$ permeance and a higher $O_2/N_2$ selectivity than the second membrane modules. Preferably, the first membrane modules are selected to have an $O_2$ permeance of at least 10 GPU ($10^{-6}$ cm$^3$/cm$^2$·sec·cm-hg) and an $O_2/N_2$ selectivity of at least 4.0 measured at operating conditions. More preferably, the first membrane modules have an $O_2$ permeance of at least 30 GPU ($10^{-6}$ cm$^3$/cm$^2$·sec·cm-hg) and an $O_2/N_2$ selectivity of at least 5.0.

Membrane modules having such properties are known in the art. They are generally referred to as high performance membranes. For example, but without limitation, the membrane material in the first modules can be made of cellulose derivatives, polyamides, polyimides, polyamide-imides, polysulfones, copolymers and blends thereof. The membrane material is preferably in the form of asymmetric or composite hollow fibers, but may be in roll form, and plate and frame cartridges. More preferably, the first membrane modules contain hollow fibers described in one of U.S. Pat. Nos. 4,230,463; 4,983,191; 5,015,270; 5,085,676; and 5,096,468, and EP 0 207 721 A2; the contents of which are hereby incorporated by reference.

The temperature of the compressed air and/or the membrane has an affect on the permeability and selectivity of the membrane modules. For example, for a given compressed air flow rate and pressure, the permeability of the membrane can increase as the temperature increases. Thus, it is preferable to contact the compressed air with the first membrane modules at a temperature ranging from 0° C. to 100° C., and preferably from 0° C. to 80° C. Of course, the compressed air can be heated prior to the contacting step in order to maximize the productivity of the membrane modules.

The flow rate of the compressed air to the first membrane modules can vary, depending on the particular NEA requirements of the aircraft fuel tanks. Generally, however, the flow rate of the compressed air into the first membrane modules should be sufficient to provide enough NEA to the fuel tanks to maintain an oxygen concentration in the ullage space below the explosive range, i.e., 9% by volume $O_2$ or less, (hiring periods of low demand such as cruising. The first NEA stream preferably has a flow rate of 0.05 lbs/min (0.023 kg/min) to 20 lbs/min (9.091 kg/min) and an oxygen content of 9% by volume or less. More preferably, the first NEA stream has a flow rate of 0.5 lbs/min (0.227 kg/min) to 2.0 lbs/min (0.909 kg/min) and an oxygen content of 5% by volume or less. The first NEA stream is advantageously introduced into the fuel tank of an aircraft during periods of low NEA demand to maintain the oxygen content in the ullage of the fuel tank below the explosive range.

During certain flight maneuvers such as ascent and descent, the first membrane modules may not be able to provide sufficient NEA flow to the aircraft's fuel tank to maintain the oxygen concentration in the ullage below the explosive limit. Thus, it would be advantageous to employ less efficient, but higher productivity membrane modules to supply the required NEA.

Like the first membrane modules, the second membrane modules contain a membrane material that preferentially permeates oxygen and retains nitrogen. The membrane material in the second modules, however, is preferably highly permeable so as to fulfill the high demand of NEA during flight periods such as ascent and descent.

The second membrane modules preferably have an $O_2$ permeance of at least 100 GPU ($10^{-6}$ cm$^3$/cm$^2$·sec·cm-hg) and an $O_2/N_2$ selectivity of at least 1.5 measured at operating conditions. More preferably, the second membrane modules have an $O_2$ permeance of at least 200 GPU ($10^{-6}$ cm$^3$/cm$^2$·sec·cm-hg) and an $O_2/N_2$ selectivity of at least 2.0. These membrane modules are usually referred to as having ultra high permeability.

Various such membrane materials are known in the art. For example, but without limitation, cellulose derivatives, polyamides, polyimides, polyamide-imides, polysulfones, copolymers and blends thereof have been found to be useful. The membrane materials are preferably in the form of asymmetric or composite hollow fibers, but may be in roll form, and plate and frame cartridges. More preferably, the second membrane modules contain hollow fibers described in one of U.S. Pat. Nos. 4,717,394; 5,034,024; and 5,051,114, and EP 0 207 721 A2; the contents of which are hereby incorporated by reference.

The compressed air can be contacted with the second membrane modules at the same general conditions as it is contacted with the first membrane modules. However, because more NEA is needed to fill the ullage space during high NEA demand periods, the second NEA stream generally, but not necessarily has a higher flow rate and a higher oxygen content than the first NEA stream.

The second NEA stream preferably has a flow rate of 5 lbs/min (2.273 kg/min) to 100 lbs/min (45.455 kg/min) and an oxygen content of 9% by volume or less. More preferably, the second NEA stream has a flow rate of 10 lbs/min (4.545 kg/min) to 50 lbs/min (22.727 kg/min). This second NEA stream is advantageously introduced into the fuel tank of an aircraft during periods of high NEA demand such as ascent and descent to maintain the oxygen content in the fuel tank below the explosive limit.

The second NEA stream can be introduced into the fuel tank in combination with or in lieu of the first NEA stream, depending on the particular NEA requirements of the aircraft at the time. To minimize energy consumption, one or more of the membrane modules in each set may be turned off when the NEA from those modules is not required to meet the demand of the aircraft.

Moreover, either one or both of the first and second NEA streams can be introduced directly into the liquid fuel in the fuel tank, such as through a bubbler, to scrub or remove dissolved $O_2$ from the fuel. Preferably, the first NEA stream is introduced into the liquid fuel. As those skilled in the art will readily appreciate, such an embodiment can reduce the risk of an explosion even further.

For both sets of membrane modules, if more than one is employed in each set, the modules in each set can be arranged in series and/or in parallel. If employed in series, the NEA retentate stream of one module can be used as a feed to another module in that set. In addition, either the permeate stream or the retentate stream or both can be recycled to a previous module to maximize the separation efficiency of the modules.

In its second aspect, the present invention relates a system for carrying out the above-described process. The system contains two sets of membrane modules for separating compressed air into a permeate stream comprising oxygen-enriched air and a retentate stream comprising nitrogen-enriched air. Each set has a different permeability and selectivity. In particular, the first set of membrane modules is selected to have a lower $O_2$ permeance, but a higher $O_2/N_2$ selectivity than the second set of membrane modules.

Preferably, the first membrane modules have an $O_2$ permeance of at least 10 GPU ($10^{-6}$ cm$^3$/cm$^2$·sec·cm-hg) and an $O_2/N_2$ selectivity of at least 4.0, and the second membrane modules have an $O_2$ permeance of at least 100 GPU ($10^{-6}$ cm$^3$/cm$^2$·sec·cm-hg) and an $O_2/N_2$ selectivity of at least 1.5. More preferably, the first membrane modules have an $O_2$ permeance of at least 30 GPU ($10^{-6}$ cm$^3$/cm$^2$·sec·cm-hg) and an $O_2/N_2$ selectivity of at least 5.0, and the second membrane modules have an $O_2$ permeance of at least 200 GPU ($10^{-6}$ cm$^3$/cm$^2$·sec·cm-hg) and an $O_2/N_2$ selectivity of at least 2.0.

Both sets of membrane modules contain a compressed air inlet and an NEA stream outlet. Each NEA stream outlet is connected to a conduit which is provided to convey the NEA stream from the membrane modules to the ullage of the aircraft fuel tank. Each outlet can be connected to a separate conduit. Alternatively, the outlets can be connected to a common conduit which carries the NEA into the fuel tank as needed. The system can also contain a third conduit for introducing the first NEA stream or the second NEA stream or both into the liquid fuel in the aircraft fuel tank in order to liberate at least a portion of $O_2$ dissolved in the fuel.

The first membrane modules and the second membrane modules can be arranged in a bundle-in-bundle configuration as described in U.S. Pat. No. 5,013,331; the content of which is hereby incorporated by reference. For example, one first membrane module can be arranged as the outer bundle while one second membrane module can be the inner bundle. Such an arrangement can provide significant reductions in the overall size and weight of the system.

Figure 1:
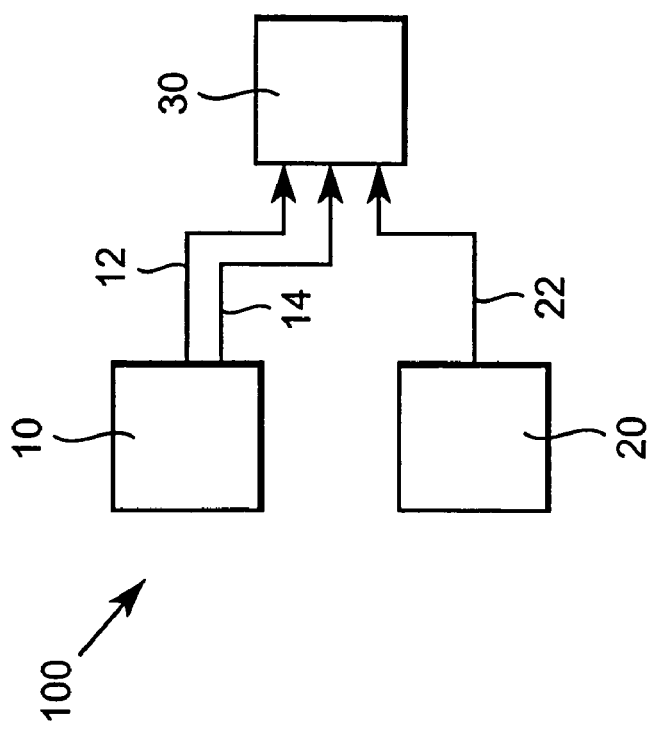
FIG. 1 depicts a system for inserting an aircraft fuel tank according to one exemplary embodiment of the present invention.

Referring to FIG. 1, according to an exemplary embodiment, a system 100 is provided for inserting an aircraft fuel tank 30. The system 100 comprises one or more first membrane modules 10 for separating compressed air into a first permeate stream comprising oxygen-enriched air and a first retentate stream comprising nitrogen-enriched air. A first conduit 12 is provided for conveying the first retentate stream into the fuel tank 30 during periods of low demand for nitrogen-enriched air.

The system 100 also comprises one or more second membrane modules 20 for separating compressed air into a second permeate stream comprising oxygen-enriched air and a second retentate stream comprising nitrogen-enriched air. A second conduit 22 is provided for conveying the second retentate stream into the fuel tank 30 during periods of high demand for nitrogen-enriched air.

A third conduit 14 is provided for introducing at least one of said first retentate stream and said second retentate stream directly into the fuel in said fuel tank 30 to liberate at least a portion of dissolved $O_2$ in the fuel. The one or more first membrane modules 10 have a lower $O_2$ permeance and a higher $O_2/N_2$ selectivity than the one or more second membrane modules 20.

Referring to FIG. 2, according to another exemplary embodiment, a system 200 is provided for inserting an aircraft fuel tank 70. The system 200 comprises one or more first membrane modules 50 for separating compressed air into a first permeate stream comprising oxygen-enriched air and a first retentate stream comprising nitrogen-enriched air. A first conduit 52 is provided for conveying the first retentate stream into the fuel tank 70 during periods of low demand for nitrogen-enriched air.

The system 200 also comprises one or more second membrane modules 60 for separating compressed air into a second permeate stream comprising oxygen-enriched air and a second retentate stream comprising nitrogen-enriched air. A second conduit 62 is provided for conveying the second retentate stream into the fuel tank 70 during periods of high demand for nitrogen-enriched air.

The first and/or second conduits 52 and 62 are connected to introduce the first and/or second retentate stream, respectively, directly into the fuel in the fuel tank 70 to liberate at least a portion of dissolved $O_2$ in the fuel. The one or more first membrane modules 50 have a lower $O_2$ permeance and a higher $O_2/N_2$ selectivity than the one or more second membrane modules 60.

While the invention has been described with reference to preferred embodiments, it is to be understood that variations and modifications may be resorted to as will be apparent to those skilled in the art. Such variations and modifications are to be considered within the purview and scope of the invention as defined by the claims appended hereto.

What is claimed is:

1. A method for inserting an aircraft fuel tank, said method comprising the steps of:
   (a) contacting compressed air with one or more first membrane modules at conditions effective to produce a first nitrogen-enriched air stream;
   (b) introducing said first nitrogen-enriched air stream into said fuel tank during periods of low demand for nitrogen-enriched air;
   (c) contacting compressed air with one or more second membrane modules at conditions effective to produce a second nitrogen-enriched air stream; and
   (d) introducing said second nitrogen-enriched air stream into said fuel tank during periods of high demand for nitrogen-enriched air,
   wherein said first membrane modules have a lower $O_2$ permeance and a higher $O_2/N_2$ selectivity than said second membrane modules, and
   wherein at least one of said first nitrogen-enriched air stream and said second nitrogen-enriched air stream is introduced directly into the fuel in said fuel tank at conditions effective to liberate at least a portion of dissolved $O_2$ in the fuel.

2. The method according to claim 1, wherein said low demand periods include cruising.

3. The method according to claim 1, wherein said high demand periods include ascent or descent or both.

4. The method according to claim 1, wherein said first nitrogen-enriched air stream is introduced directly into the fuel in the fuel tank to liberate at least a portion of dissolved O2 in the fuel.

5. The method according to claim 1, wherein said first nitrogen-enriched air stream has a lower flow rate than said second nitrogen-enriched air stream.

6. The method according to claim 1, wherein said first nitrogen-enriched air stream has a flow rate of 0.05 to 20 lbs/min at 9% by volume $O_2$ or less, and said second nitrogen-enriched air stream has a flow rate of 5 to 100 lbs/min at 9% by volume $O_2$ or less.

7. The method according to claim 6, wherein said first nitrogen-enriched air stream has a flow rate of 0.5 to 2.0 lbs/min at 5% by volume $O_2$ or less, and said second nitrogen-enriched air stream has a flow rate of 5 to 50 lbs/min at 9% by volume $O_2$ or less.

8. The method according to claim 1, wherein said first membrane modules have an $O_2$ permeance of at least 10 GPU and an $O_2/N_2$ selectivity of at least 4.0, and said second membrane modules have an $O_2$ permeance of at least 100 GPU and an $O_2/N_2$ selectivity of at least 1.5.

9. The method according to claim 8, wherein said first membrane modules have an $O_2$ permeance of at least 30 GPU and an $O_2/N_2$ selectivity of at least 5.0, and said second membrane modules have an $O_2$ permeance of at least 200 GPU and an $O_2/N_2$ selectivity of at least 2.

10. The method according to claim 1, wherein said compressed air comprises bleed air.

11. The method according to claim 1, wherein said compressed air has a pressure of 10 to 300 psig.

12. The method according to claim 1, which comprises introducing said first nitrogen-enriched air stream and said second nitrogen-enriched air stream into said fuel tank during periods of high demand for nitrogen-enriched air.

13. A method for inserting an aircraft fuel tank, said method comprising the steps of:
    (a) contacting compressed air with one or more first membrane modules at conditions effective to produce a first nitrogen-enriched air stream;
    (b) introducing said first nitrogen-enriched air stream into said fuel tank during cruising;
    (c) contacting compressed air with one or more second membrane modules at conditions effective to produce a second nitrogen-enriched air stream; and
    (d) introducing said second nitrogen-enriched air stream into said fuel tank during ascent or descent or both,
    wherein said first membrane modules have a lower $O_2$ permeance and a higher $O_2/N_2$ selectivity than said second membrane modules, and
    wherein at least one of said first nitrogen-enriched air stream and said second nitrogen-enriched air stream is introduced directly into the fuel in said fuel tank at conditions effective to liberate at least a portion of dissolved $O_2$ in the fuel.

14. The method according to claim 13, wherein said first nitrogen-enriched air stream is introduced directly into the fuel in the fuel tank to liberate at least a portion of dissolved $O_2$ in the fuel.

15. The method according to claim 13, wherein said first nitrogen-enriched air stream has a lower flow rate than said second nitrogen-enriched air stream.

16. The method according to claim 13, wherein said first nitrogen-enriched air stream has a flow rate of 0.05 to 20 lbs/min at 9% by volume $O_2$ or less, and said second nitrogen-enriched air stream has a flow rate of 5 to 100 lbs/min at 9% by volume $O_2$ or less.

17. The method according to claim 16, wherein said first nitrogen-enriched air stream has a flow rate of 0.5 to 2.0 lbs/min at 5% by volume $O_2$ or less, and said second nitrogen-enriched air stream has a flow rate of 5 to 50 lbs/min at 9% by volume $O_2$ or less.

18. The method according to claim 13, wherein said first membrane modules have an O2 permeance of at least 10 GPU and an $O_2/N_2$ selectivity of at least 4.0, and said second membrane modules have an $O_2$ permeance of at least 100 GPU and an $O_2/N_2$ selectivity of greater than 1.5.

19. The method according to claim 18, wherein said first membrane modules have an $O_2$ permeance of at least 30 GPU and an $O_2/N_2$ selectivity of at least 5.0, and said second membrane modules have an $O_2$ permeance of at least 200 GPU and an $O_2/N_2$ selectivity of at least 2.

20. The method according to claim 13, wherein said compressed air comprises bleed air.

21. The method according to claim 13, wherein said compressed air has a pressure of 10 to 300 psig.

22. The method according to claim 13, which comprises introducing said first nitrogen-enriched air stream and said second nitrogen-enriched air stream into said fuel tank during ascent or descent or both.

23. A system for inserting an aircraft fuel tank, said system comprising:
    (a) one or more first membrane modules for separating compressed air into a first permeate stream comprising oxygen-enriched air and a first retentate stream comprising nitrogen-enriched air;
    (b) a first conduit for conveying said first retentate stream into said fuel tank during periods of low demand for nitrogen-enriched air;
    (c) one or more second membrane modules for separating compressed air into a second permeate stream comprising oxygen-enriched air and a second retentate stream comprising nitrogen-enriched air;
    (d) a second conduit for conveying said second retentate stream into said fuel tank during periods of high demand for nitrogen-enriched air; and
    (e) a third conduit for introducing at least one of said first retentate stream and said second retentate stream directly into the fuel in said fuel tank to liberate at least a portion of dissolved $O_2$ in the fuel,
    wherein said one of more first membrane modules have a lower $O_2$ permeance and a higher $O_2/N_2$ selectivity than said one or more second membrane modules.

24. The system according to claim 23, wherein said first membrane modules have an $O_2$ permeance of at least 10 GPU and an $O_2/N_2$ selectivity of at least 4.0, and said second membrane modules have an $O_2$ permeance of at least 100 GPU and an $O_2/N_2$ selectivity of at least 1.5.

25. The system according to claim 24, wherein said first membrane modules have an $O_2$ permeance of at least 30 GPU and an $O_2/N_2$ selectivity of at least 5.0, and said second membrane modules have an $O_2$ permeance of at least 200 GPU and an $O_2/N_2$ selectivity of at least 2.

26. The system according to claim 23, wherein said first membrane modules and said second membrane modules are arranged in a bundle-in-bundle configuration.

27. The system according to claim 26, wherein said first conduit and said second conduit have common portions.

28. A system for inserting an aircraft fuel tank, said system comprising:
    (a) one or more first membrane modules for separating compressed air into a first permeate stream comprising oxygen-enriched air and a first retentate stream comprising nitrogen-enriched air;
    (b) a first conduit for conveying said first retentate stream into said fuel tank during periods of low demand for nitrogen-enriched air;
    (c) one or more second membrane modules for separating compressed air into a second permeate stream comprising oxygen-enriched air and a second retentate stream comprising nitrogen-enriched air;

(d) a second conduit for conveying said second retentate stream into said fuel tank during periods of high demand for nitrogen-emiched air;
wherein said first and/or second conduits are connected to introduce said first and/or second retentate stream, respectively, directly into the fuel in said fuel tank to liberate at least a portion of dissolved $O_2$ in the fuel; and
wherein said one or more first membrane modules have a lower $O_2$ permeance and a higher $O_2/N_2$ selectivity than said one or more second membrane modules.

* * * * *

UNITED STATES PATENT AND TRADEMARK OFFICE
CERTIFICATE OF CORRECTION

| | | |
|---|---|---|
| PATENT NO. | : 8,245,978 B1 | Page 1 of 1 |
| APPLICATION NO. | : 09/107141 | |
| DATED | : August 21, 2012 | |
| INVENTOR(S) | : K. Beers et al. | |

It is certified that error appears in the above-identified patent and that said Letters Patent is hereby corrected as shown below:

In Column 6, line 33, replace the word "inserting" with the word --inerting--.

In Column 7, line 27, replace the word "inserting" with the word --inerting--.

In Column 8, line 16, replace the word "inserting" with the word --inerting--.

In Column 8, line 54, replace the word "inserting" with the word --inerting--.

In Column 9, line 3, replace the words "nitrogen-emiched" with the words --nitrogen-enriched--.

Signed and Sealed this
Sixteenth Day of October, 2012

David J. Kappos
*Director of the United States Patent and Trademark Office*